(12) United States Patent  (10) Patent No.: US 9,254,771 B2
Brown et al.  (45) Date of Patent: Feb. 9, 2016

(54) VEHICULAR FLOOR MAT SYSTEM

(71) Applicants: Johnny Lamar Brown, Chattanooga, TN (US); Annette Marie Stroud, Chattanooga, TN (US); Erik Edward Anderson, Cleveland, TN (US)

(72) Inventors: Johnny Lamar Brown, Chattanooga, TN (US); Annette Marie Stroud, Chattanooga, TN (US); Erik Edward Anderson, Cleveland, TN (US)

( * ) Notice: Subject to any disclaimer, the term of this patent is extended or adjusted under 35 U.S.C. 154(b) by 136 days.

(21) Appl. No.: 14/225,988

(22) Filed: Mar. 26, 2014

(65) Prior Publication Data

US 2015/0274052 A1 Oct. 1, 2015

Related U.S. Application Data

(63) Continuation-in-part of application No. 14/184,032, filed on Feb. 19, 2014, now Pat. No. 9,199,566, and a continuation-in-part of application No. 14/078,036, filed on Nov. 12, 2013, now Pat. No. 8,722,170.

(51) Int. Cl.
*B60N 3/04* (2006.01)

(52) U.S. Cl.
CPC .............. *B60N 3/048* (2013.01); *B60N 3/046* (2013.01); *Y10T 428/24008* (2015.01); *Y10T 428/24025* (2015.01)

(58) Field of Classification Search
CPC ............ B32B 11/00; B32B 3/02; B32B 3/10; Y10T 428/23
USPC ............................................. 428/99, 98, 100
See application file for complete search history.

(56) References Cited

U.S. PATENT DOCUMENTS 4,588,628 A * 5/1986 Roth ............................... 428/85

* cited by examiner

*Primary Examiner* — Brent O'Hern
(74) *Attorney, Agent, or Firm* — Frank Marino

(57) ABSTRACT

A floor mat for a vehicle includes an adapter plate for engaging the vehicle's mat retaining system, a mat portion, and a fastener for securing the mat portion to the adapter plate. The configuration of the adapter plate allows the mat portion to be transversely, longitudinally, and rotationally aligned and secured to the vehicle's floor despite variations in the arrangements of different vehicles' mat retaining systems. The mat portion may include a plurality of peripheral guidelines to assist the end-user to trim the mat to fit any intended one of a plurality of automobile models.

20 Claims, 8 Drawing Sheets

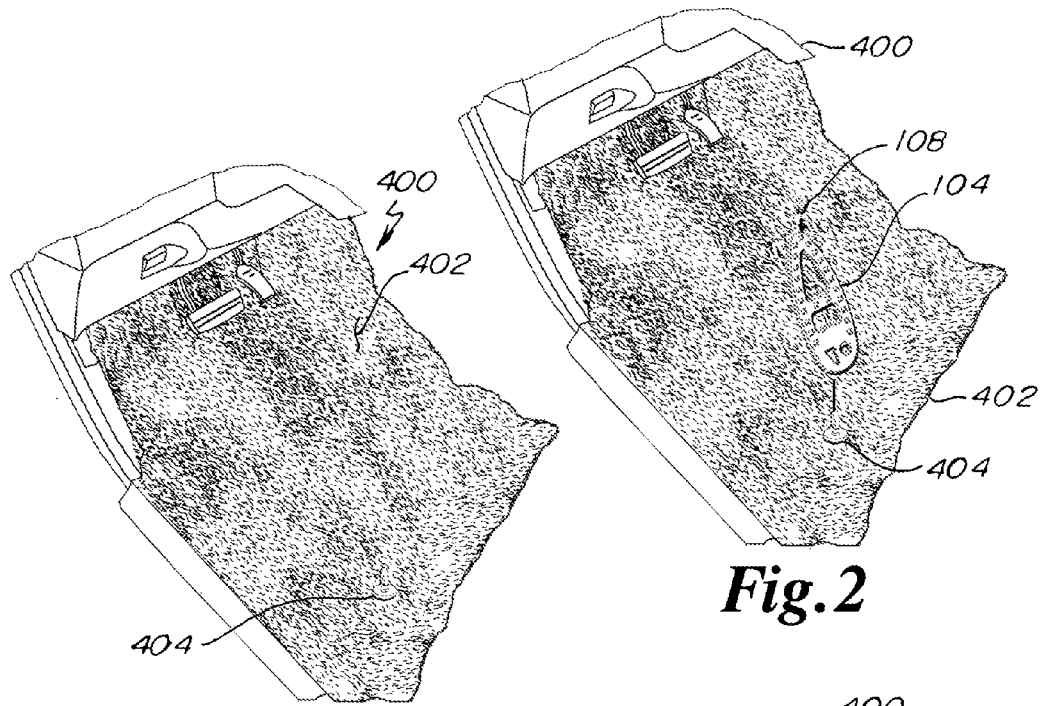
*Fig.1*
*Fig.2*
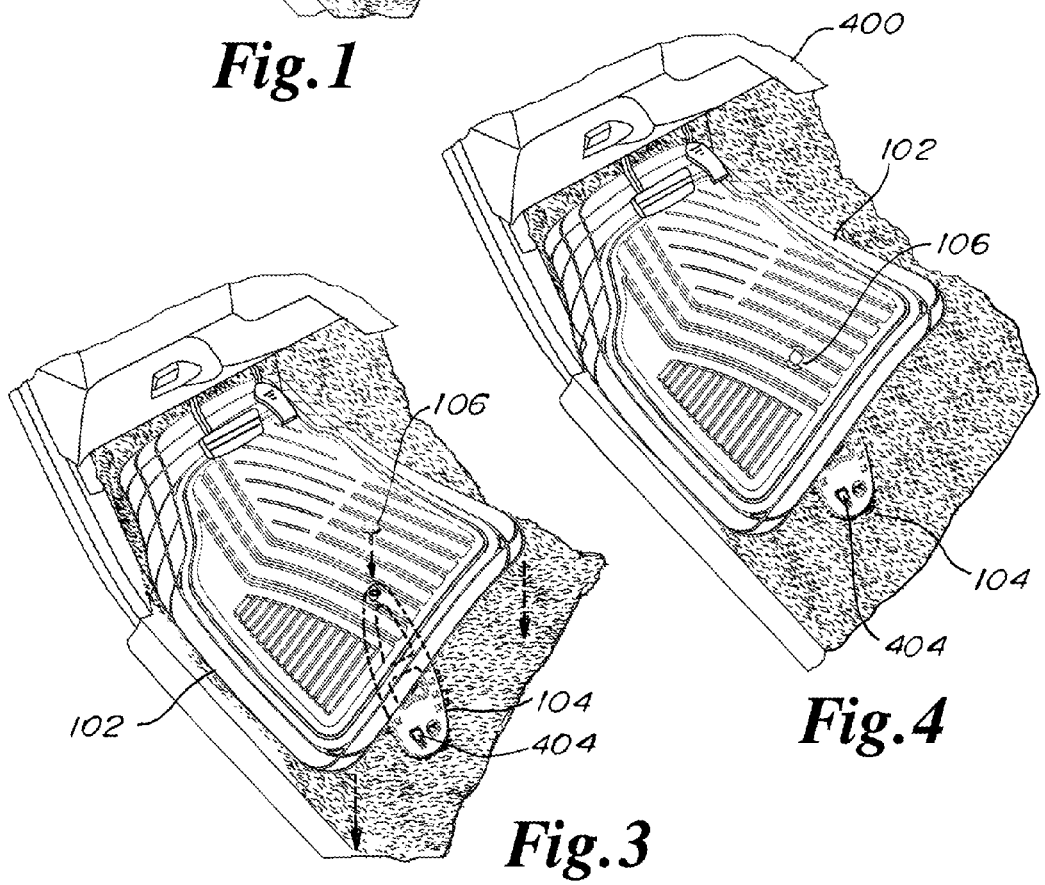
*Fig.3*
*Fig.4*

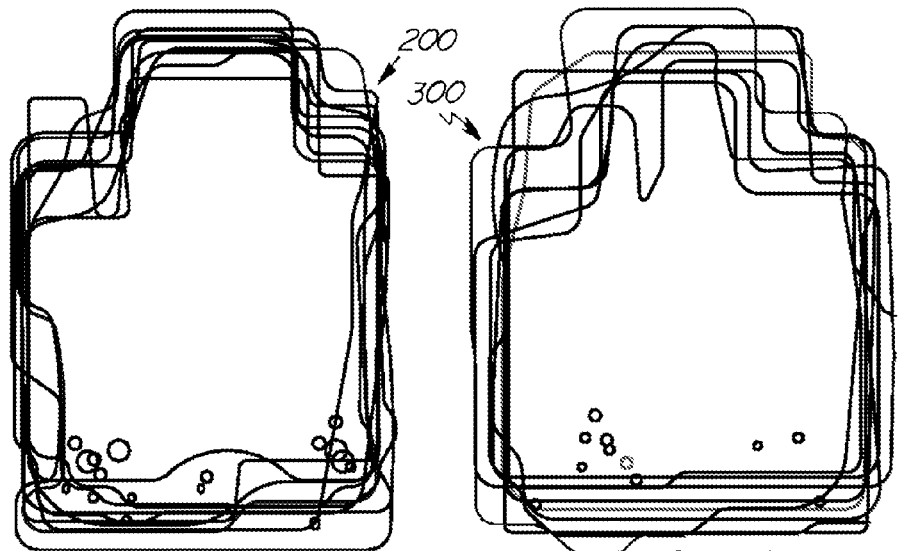
Fig.14 (PRIOR ART)
Fig.15 (PRIOR ART)
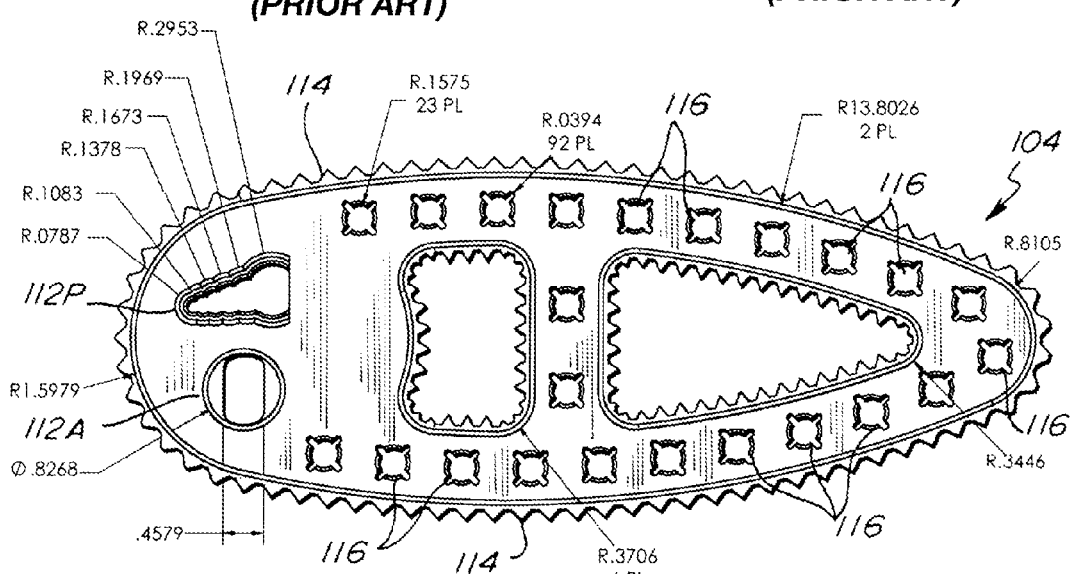
Fig.16
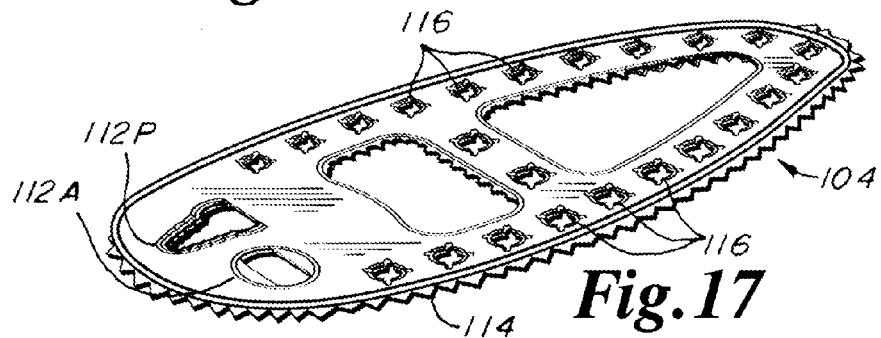
Fig.17

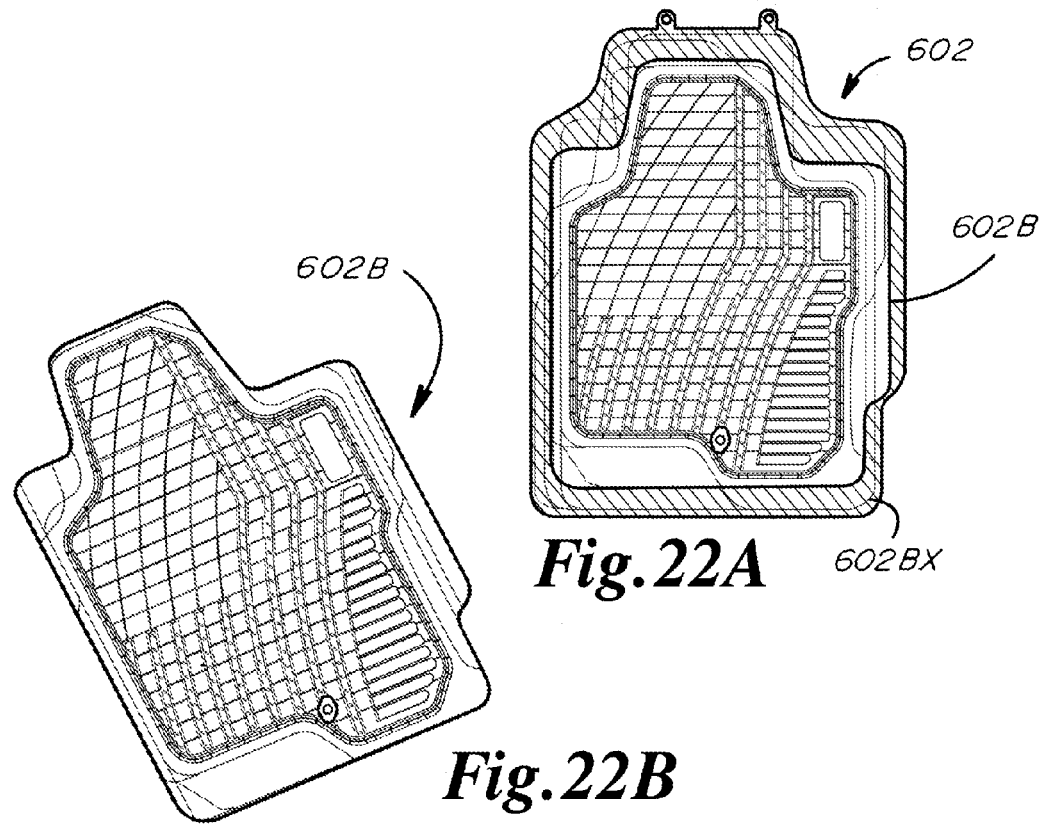
Fig. 22A
Fig. 22B
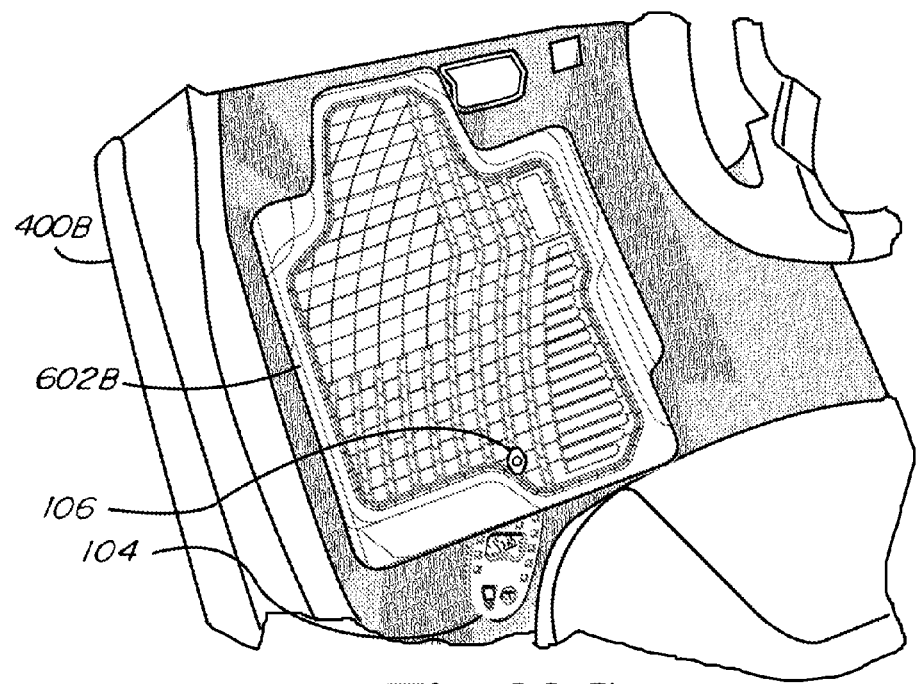
Fig. 22C

VEHICULAR FLOOR MAT SYSTEM

RELATED APPLICATION

This application is a Continuation-in-Part of and claims the benefit to U.S. non-Provisional application Ser. No. 14/078,036 filed on 12 Nov. 2013, and Ser. No. 14/184,032 filed on 19 Feb. 2014, the entire teachings of both being incorporated herein by reference in their entireties.

FIELD OF THE INVENTION

The present invention is related to vehicular floor mats. More specifically, the present invention is related to a vehicle floor mat system engageable to and customizable with the multitude of mat-securing features which vary from vehicle to vehicle. Alternatively, the present invention is related to an adapting system for engaging and customizing an aftermarket automotive floor mat to the multitude of mat-securing features and floor shapes which vary from automobile to automobile.

BACKGROUND

Automotive floor mats and floor mats for other vehicles are commonly used to contain spills and shoe-borne debris and to protect the underlying carpet. Vehicle manufactures typically provide such floor mats with or as an optional accessory for these purposes. To prevent slippage of such mats about the floor, auto manufacturers often provide securing means that hold the mat in its intended position. Because such slippage could allow the mat to interfere with operation of the accelerator and brake pedals, such securing means are now required for a mat at the driver's feet.

Each automaker has its own means for securing its mats within its cars, which has heretofore retarded the ability for aftermarket mat manufacturers to offer mats which universally fit to multiple or all cars. To date, retailers have been forced to carry a first selection of mats which are useful in one make of automobile, a second selection useful in a second make, a third selection useful in a third make, etc. Obviously, the retailers have limited shelf space for offering such a wide number of mat selections, so the number of automobile makes for which they offer mats must be limited, the number of selections (colors, styles, etc) for each make must be compromised, and/or the number of pieces kept in inventory must be reduced.

Each automobile model has a differently shaped floor to which the floor mat is expected to fit and conform. There exist in the prior art several vehicular floor mats which provide for trimming by the end-user to best fit the mat within the floor of the intended vehicle. Among those, U.S. Pat. No. 6,794,013 teaches a mat having "relatively thin" flaps which "can be trimmed down with scissors if desired, to achieve the best fit of the floor mat for a particular floor area", and the WeatherTech "Trim-to-Fit All Vehicle Cargo Mat" (www.amazon.com/WeatherTech-Trim-Vehicle-Cargo-Black/dp/B0003IDE4U8) includes cutting guide lines to assist the end-user in trimming the mat to best fit to the intended vehicle. None of such prior art mats enable or suggest the ability to securely engage the mat with the specific engagement means of the intended vehicle, or provide for secure engagement with the multitude of mat-securing features which vary in position and configuration from automobile to automobile.

There exists a need for reducing the number of mats that a retailer must stock to serve the multitude of automobile makes and models and the similar multitude of securing arrangements, and such is an object of the present invention. There exists a need for reducing the number of mats that an aftermarket manufacturer must offer to serve the multitude of automobile makes and models, and such is an object of the present invention. There exists a need to adapt and customize aftermarket mats to the multitude of automakers' mat securing arrangements and floor shapes, and such is an object of the present invention. Further needs and objects exist which are addressed by the present invention, as may become apparent by the included disclosure of an exemplary embodiment thereof.

SUMMARY OF THE INVENTION

The invention may be practiced in a floor mat for a vehicle floor of the type having a floor mat retainer defining a fixed first vertical axis, the floor mat including an adapter portion, a mat portion, and a mat fastener. The adapter portion may include a planar panel disposed between the mat portion and the vehicle floor and having a primary receiver for engaging the adapter portion to the floor mat retainer, and a multitude of secondary receivers adapted to be selectably engaged by the mat fastener. The mat portion may include a locator disposed inboard on the mat portion and engagable to a selected one of the adapter's secondary receivers by the mat fastener to define a selectable second vertical axis parallel to the fixed first vertical axis. The adapter may be pivotable along a substantially horizontal plane about the fixed first vertical axis such that the selectable second vertical axis is pivotable about the fixed first pivot axis. The mat portion may be pivotable along a substantially horizontal plane about the selectable second vertical axis, and the mat portion may include a plurality of peripheral outlines for guiding trimming of the mat portion into a mat shape, one of the peripheral outlines intended to cause the mat shape to correspond with a floor shape of the vehicle floor, whereby trimming of the mat portion along the one of the peripheral outlines causes the mat shape to correspond with the floor shape. Variation in the selection of the adapter's secondary receiver to which is engaged the mat portion and pivoting of the adaptor about the fixed first vertical axis may enable variation of a transverse and longitudinal disposition of the mat portion relative to the vehicle floor, and rotation of the mat portion about the selectable second vertical axis may enable variation of a rotational disposition of the mat portion relative to the vehicle floor.

The adapter may further include cleats extending downwardly there-from to engage the vehicle's floor and prevent inadvertent movement of the adapter relative thereto. The primary receiver may be a passive vehicle floor mat retainer receiver. The adapter may further include a second primary receiver adapted to engage the adapter to an active vehicle floor mat retainer. Or the primary receiver may be an active vehicle floor mat retainer receiver.

The locator may be a hole through the mat portion. The fastener may include separate first and second portions, the first portion having a shank passable through the hole and a head incapable of passing through the hole, and the second portion may be a grommet rigidly engageable to the selected secondary receiver and adapted to capture the shank portion to engage the mat portion to the adapter. Or the locator may include the fastener.

The invention may alternatively be practiced in a floor mat for use on a vehicle floor and for use with an adapter engaged to a mat retainer of the vehicle floor such that the adapter is pivotable about a fixed first vertical axis defined by the mat retainer, and the adapter may be of the type having a multitude of receivers to enable engagement of the mat to the adapter in a multitude of dispositions. The floor mat may include a locator disposed inboard on the mat for alignment with a selected one of the receivers to allow variation of a transverse and longitudinal disposition of the mat relative to the adapter, the locator defining a second vertical axis parallel to the fixed first vertical axis. The floor mat may also include a plurality of peripheral outlines for guiding trimming of the mat into a mat shape, one of the peripheral outlines intended to cause the mat shape to correspond with a floor shape of the vehicle floor, wherein trimming of the mat portion along the one of the peripheral outlines causes the mat shape to correspond with the floor shape. Rotation of the mat about the second vertical axis may cause variation of a rotational disposition of the mat relative to the adapter.

The mat may further include a fastener to secure the mat to the adapter. The fastener may secure the mat to the adapter at the locator. The locator may include the fastener.

The invention may alternatively be practiced in a floor mat system for use on a vehicle floor and adaptable for engagement to one or more of a multitude of vehicle mat retainers of various types and positions, wherein the system includes an adapter overlying the vehicle floor and affixable to one of the one or more of a multitude of vehicle mat retainers, and a mat overlying and affixable to the adapter. The one of the one or more of a multitude of vehicle mat retainers may define a fixed first vertical axis, and the adapter may include a planar panel having means for engaging the adapter to the one of the one or more of a multitude of vehicle mat retainers such that the adapter is pivotable along a substantially horizontal plane about the fixed first vertical axis. A multitude of receivers each may be adapted to allow engagement of the mat thereto. The mat may include a locator disposed inboard on the mat and engagable to and alignable with a selected one of the adapter's receivers to enable variation of a transverse and longitudinal disposition of the mat relative to the vehicle's floor. The locator may define a second vertical axis parallel to the fixed first vertical axis, whereby rotation of the mat along a substantially horizontal plane about the second vertical axis enables variation of a rotational disposition of the mat portion relative to the vehicle's floor. And the mat may include a plurality of peripheral outlines for guiding trimming of the mat into a mat shape, one of the peripheral outlines intended to cause the mat shape to correspond with a floor shape of the vehicle floor, whereby trimming of the mat portion along the one of the peripheral outlines causes the mat shape to correspond with the floor shape.

The adapter may further include cleats extending downwardly there-from to engage the vehicle's floor and prevent inadvertent movement of the adapter relative thereto. The means for engaging the adapter to the one of the one or more of a multitude of vehicle mat retainers may be a receiver for a passive vehicle floor mat retainer. The adapter may further include a receiver for an active vehicle floor mat retainer. Or the means for engaging the adapter to the one of the one or more of a multitude of vehicle mat retainers may be a receiver for an active vehicle floor mat retainer. The locator may be a hole through the mat.

The floor mat may further include a fastener having separate first and second portions, the first portion having a shank passable through the hole and a head incapable of passing through the hole, and the second portion is a grommet rigidly engageable to the selected one of the adapter's receivers wherein the grommet may capture the shank portion to engage the mat to the adapter. The locator may be a fastener for securing the mat to the adapter.

Further features and aspects of the invention are disclosed with more specificity in the Detailed Description and Drawings of an exemplary embodiment provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 1 through 4 are a progressive series of perspective views of the driver's side floor of a first typical automobile including a pair of mat securing posts to show the installation of a mat system according to an exemplary embodiment of the invention;

FIGS. 14 and 15 are overlays showing the multitude of varying mat shapes and retainer arrangements for prior art cars (FIG. 14) and trucks (FIG. 15);

FIG. 16 is a top view of the adapter of the system of FIG. 4;

FIG. 17 is a perspective view of the adapter of the system of FIG. 4;

FIG. 22A is a plan view of the trim-to-fit mat of FIG. 20 for use in a third typical automobile, with the to-be-trimmed area shown cross-hatched;

FIG. 22B is a perspective view of the mat of FIG. 22A after trimming; and

FIG. 22C is a perspective view of the system of FIG. 4 using the mat of FIG. 22B in the third typical automobile.

DETAILED DESCRIPTION

Figure 13:
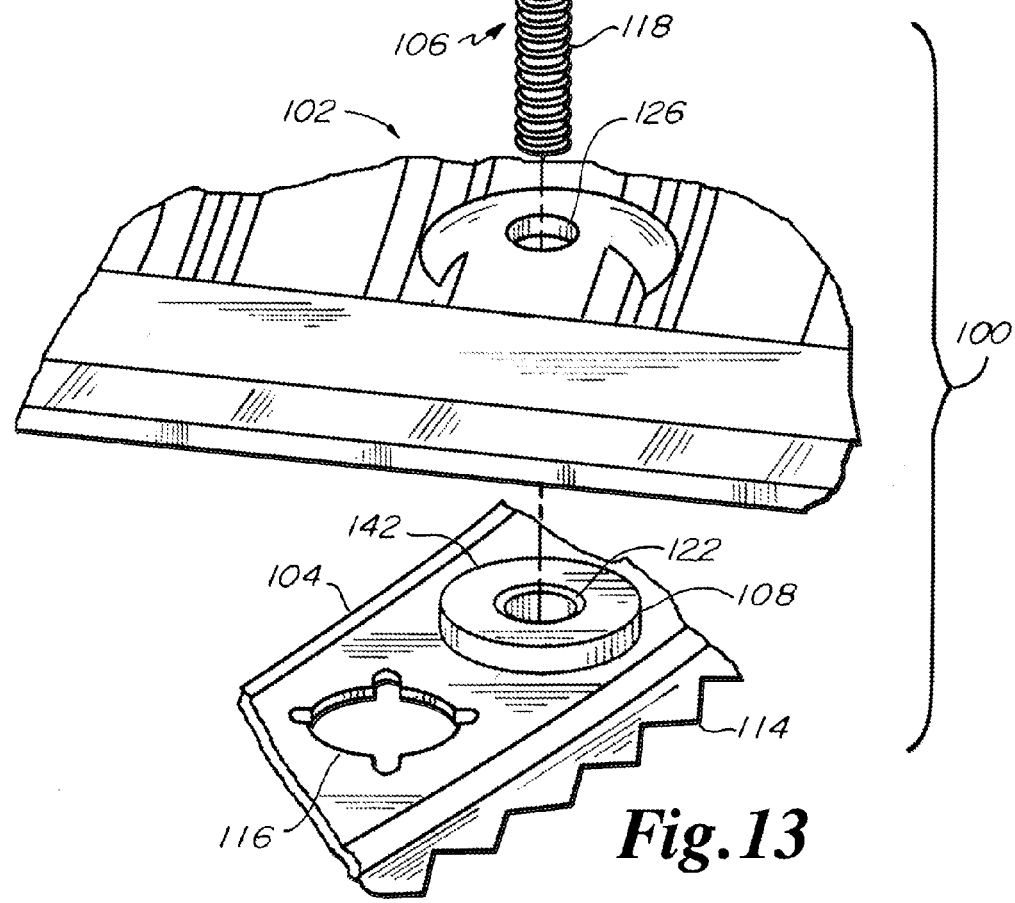
FIG. 13 is a partial exploded view of the system of FIG. 4.

Reference is first made to FIGS. 13 and 14, which are diagrams showing overlaid outlines of the prior art original equipment manufacture's (OEM) drivers side front floor mats for the US's top ten selling cars (FIG. 14) and trucks/SUVs (FIG. 15). Each mat outline includes the receiving holes that mat employs to engage the mat retainers provided in the vehicle for which that mat is intended. Represented in diagram 200 of FIG. 14 are the mats for car models Honda Accord, Nissan Altima, Toyota Camry, Toyota Corolla, Honda Civic, Hyundai Sonata, Chevy Malibu, Chevy Impala, Ford Fusion, and Ford Focus. Represented in diagram 300 of FIG. 15 are the mats fir truck/SUV models Ford F-Series, Dodge Ram, Chevy Silverado/GMC Sierra, Ford Escape, Honda CRV, Ford Edge, Toyota Rav-4, Chevy Equinox, and Chrysler Town & Country. The variously sized and positioned retainer receiving holes for each mat are shown.

The purpose for the FIGS. 13 and 14 diagrams is to demonstrate the wide range of retainer receiving hole patterns, and the corresponding wide range of retainer arrangements, that must be considered by aftermarket mat manufacturers. The purpose for the FIGS. 13 and 14 diagrams is also to demonstrate the wide range of mat shapes that must be considered by aftermarket mat manufacturers. The diagrams also demonstrate the task at hand for retailers wishing to sell replacement mats for a multitude of car and truck models . . . even when only considering the top ten selling models and ignoring the rest. It can be appreciated that merely providing dozens of holes in an aftermarket mat and calling it "universal" would be impractical, as such a hole-filled mat would be unable to retain spilled fluids and shoe-borne debris, would be aesthetically unappealing, and it would be near impossible to figure out which holes suit any given vehicle without numerous attempts.

Next, referring momentarily to FIGS. 5 through 11, close-up views show two of the many typical prior art OEM mat retainers that such vehicles now employ to retain their dedicated mats. Today's cars will typically include either an "active" or a "passive" retainer system. While the dimensions and details of each auto manufacturer's active and passive retainers differ, the distinction lies in the need for the user to act on the active retainer to cause engagement, while the passive retainer will engage automatically as the mat is placed over it. In FIGS. 5, 6, 10, and 11 an example of a "passive" retainer 404P is shown, and in FIGS. 7, 8, and 9 an example of an "active" retainer 404A is shown. Retainers 404A and 404P are by no means intended to represent all existing prior art retainers and are simply provided as examples. Alternatively shaped retainer receivers may be provided in the adapter plate to accommodate other active and passive retainers should it be desired to use the mat system with additional vehicles that the disclosed receivers will not properly engage.

Typically, a "passive retainer" will be a simple upright post, a headed post, a hook, or some similar device affixed to and projecting upwardly from the automobile's floor. It enables the user to simply slip the retaining hole of the mat over it to engage it, and the mat is thus prevented from sliding about the car's floor. Typically, an "active retainer" will be a device affixed to the automobile's floor that includes some moveable component which, after the mat's retaining hole has been slipped over it, is twisted, slid, or otherwise moved to engage and lock the mat to the floor, and the mat is thus prevented from sliding about the car's floor or from being lifted from the floor without further action on the retainer by the user. As used in this document, the terms "active retainer" and "passive retainer" are so intended, and such should be considered the definitions of these terms as used herein.

Referring next to FIGS. 1 through 4, installation of an exemplary mat system 100, according to the invention, into a typical automobile 400 is shown. The system includes a contoured mat portion 102, an adapter plate 104, a headed fastener pin 106, and a grommet 108. The automobile's carpeted floor 402 includes a pair of mat retainers 404 which are permanently installed in the automobile at manufacture to mate with and retain a particular mat made by the auto manufacturer and dedicated to this automobile model. The retainers may be either active or passive retainers in this example.

Adapter plate 104 is preferably made of Polypropylene or ABS plastic, but could be made of metal or any suitable alternative material. It includes first and second retainer receivers 112A and 112P, called "primary receivers" for engaging one of the automobile's retainers, and an array of twenty-three "secondary receivers" in the form of holes 116 for use in engaging the mat portion to the adapter plate. The adapter plate is swung horizontally and positioned over the floor so that the appropriate primary receiver is directly over the retainer and the secondary receivers are generally over the center to the portion of the floor where the mat portion is to be placed. This ensures that at least one of the secondary receivers will be within a few centimeters of the ideal location for proper positioning of the mat portion. The adapter plate is then dropped down and its primary receiver is slipped over the retainer. The adapter plate includes cleats 114 which can either be "wiggled" down into the fibers of the floor's carpet, ort will be pushed down into the fibers over time, to prevent inadvertent later rotation of the adapter plate relative to the retainer. The adapter plate is secured in place as one would normally secure an OEM mat . . . if the retainer is passive, this portion of the installation is complete, but if the retainer is active, the retainer is moved to engage and lock the adapter plate in place.

Figure 12:
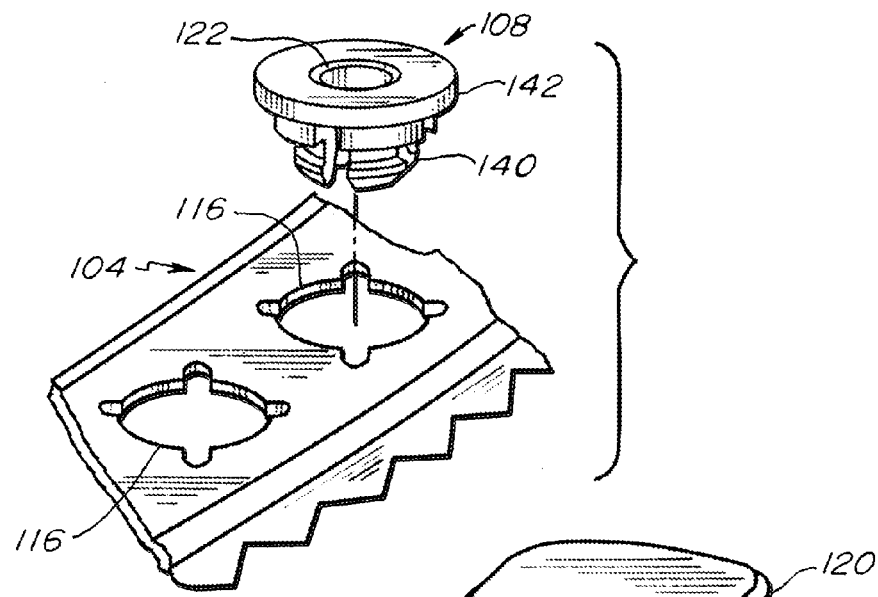
FIG. 12 is a partial exploded view of the grommet and adapter plate of the system of FIG. 4.
Figure 19:
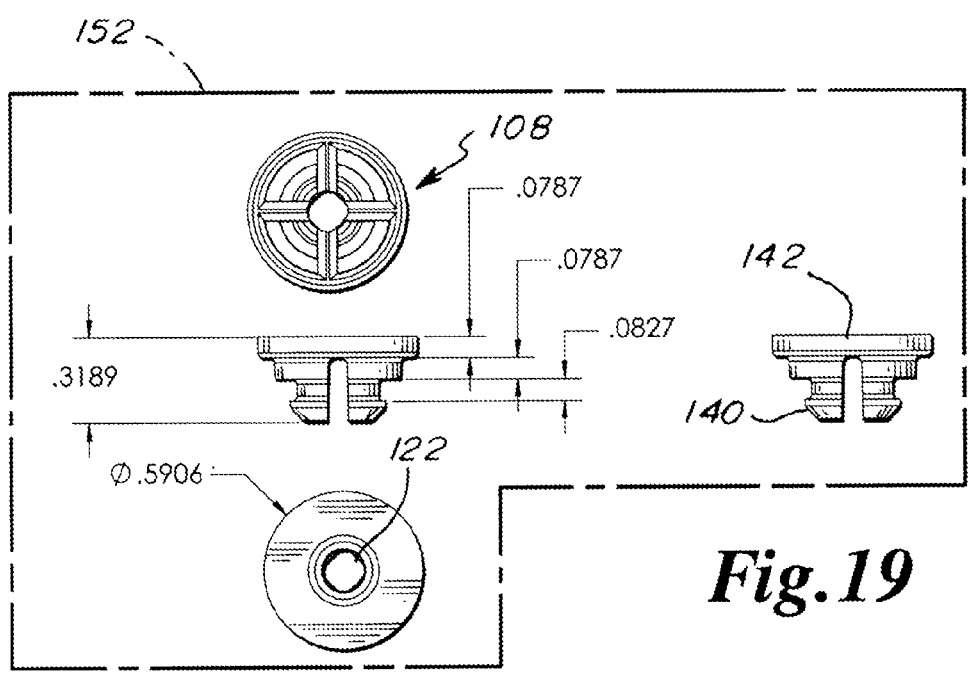
FIG. 19 is a multi-view dimension drawing of the grommet of the system of FIG. 4.

Next, after selecting which secondary receiver 116 is closest to the center of the floor by observation, grommet 108 is pushed and snapped into that receiver, as shown in close-up in FIG. 12. Referring to FIG. 19, one can see that the grommet, preferably made of ABS or POM plastic, includes a shank portion 140 and a head portion 142, the shank portion being cross-slotted to allow it to be temporarily compressed as it is inserted into the adapter plate's receiver and to then expand to secure the grommet to the receiver. The grommet has a hole 122 passing longitudinally through its center.

The mat portion is next laid over the adapter plate and grommet such that its locator hole 126 is directly over hole 122 of the grommet, and the mat portion is rotationally aligned with the floor. Because the centermost secondary receiver 116 was chosen on the adapter plate into which to place the grommet, the mat portion should be properly longitudinally and transversely aligned once it is rotationally aligned. If, however, it is found that the mat portion is not properly aligned transversely or longitudinally, the grommet may be easily popped out of the chosen receiver and snapped into another.

The mat portion is preferably injection molded of thermoplastic rubber and may include carpeted sections, support and perimeter ribbing, and spill-containing reservoirs. The flexibility of the mat allows it to be shipped and sold in a flat condition, yet adapt to the contours of the vehicle's floor.

Figure 18:
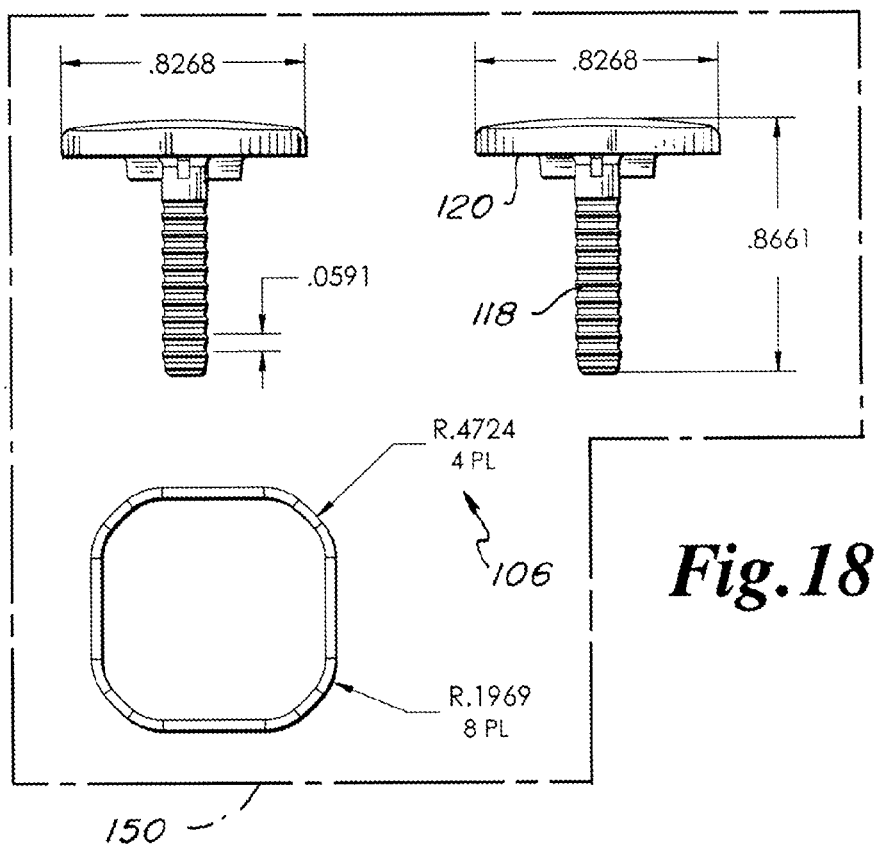
FIG. 18 is a multi-view dimension drawing of the fastening pin of the system of FIG. 4.

With the mat portion properly aligned, shank portion 118 of fastener pin 106 is next passed though locator hole 126 and into grommet hole 122, as best seen in FIG. 13, to secure the mat portion to the adapter plate. Referring to FIGS. 13 and 18, it can be seen that the preferably polypropylene or ABS fastener pin's shank portion 118 is continuously barbed. This allows that that it can engage an unshown internal rib within grommet hole 122 regardless of the depth that the fastener pin is inserted into the grommet. This adjustability allows for snug securement of the mat portion to the grommet despite variations in the mat portion's thickness. The fastener pin is pushed in until its head 120 sits firmly down on the locator hole and the internal rib of the grommet engages the mating barb of the fastener pin's shank. The fastener pin may be removed to remove the mat portion from the adapter plate, such as for realigning it, by firmly pulling on the fastener pin's head.

Referring to FIGS. 5, 6, 10 and 11, it can be seen that receiver 112P is a tapered keyhole, stepped and contoured to enable it to engage a wide range of passive retainer shapes and sizes, including exemplary passive headed retainer 404P. Referring to the dimension drawings of FIG. 16 it can be seen that the larger end of this opening is wide enough to receive a passive headed retainer having a head diameter over one half inch. The larger end of the keyhole is simply passed over the retainer's head 406P and the adaptor plate is then pushed forwardly until the tapering of the keyhole grasps the retainer's shank 408P, then the adapter plate is pressed down so that its cleats 114 engage the carpet.

Figure 5:
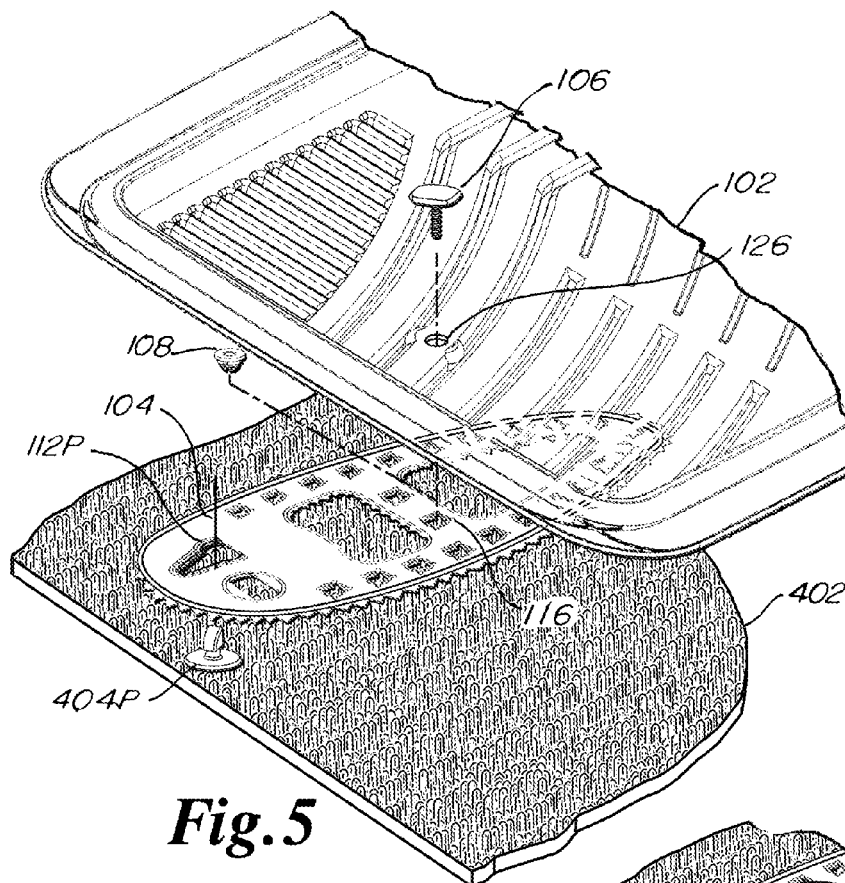
FIG. 5 is a partial close-up exploded view of the system of FIG. 4 and a passive retainer.
Figure 7:
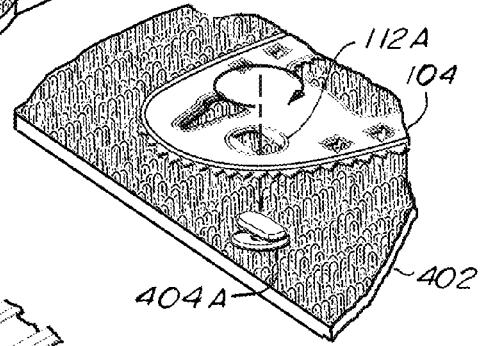
FIG. 7 is a partial close-up exploded view of the system of FIG. 4 and an active retainer.
Figure 6:
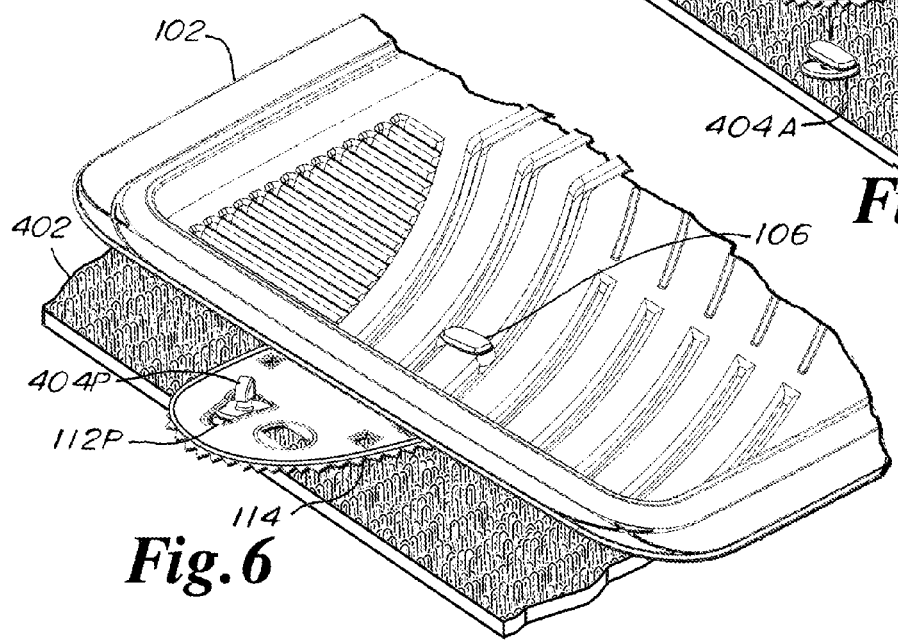
FIG. 6 is a close up perspective view of the system of FIG. 4 and the passive retainer.
Figure 8:
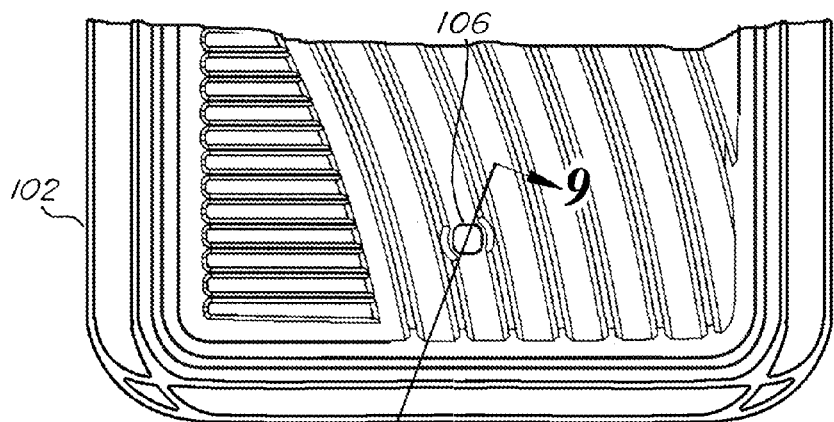
FIG. 8 is a partial top view through the system of FIG. 4 and an active retainer.
Figure 9:
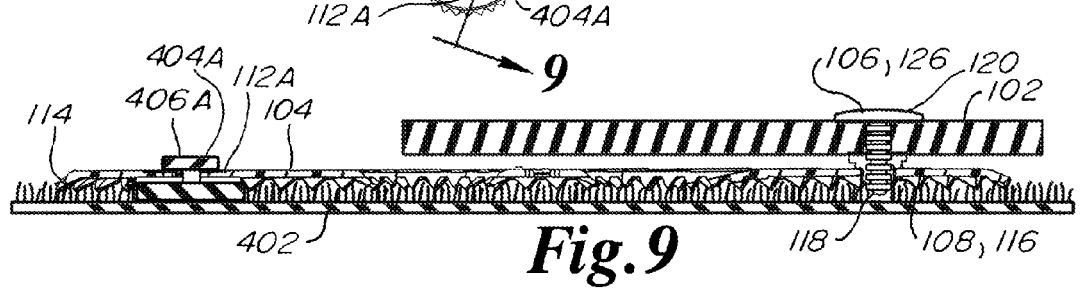
FIG. 9 is a partial cross-section through the system of FIG. 4 and the active retainer taken at line 9-9 of FIG. 8.
Figure 10:
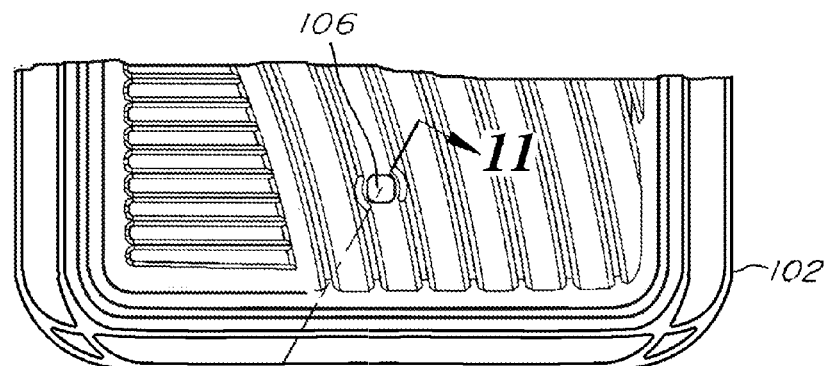
FIG. 10 is a partial top view through the system of FIG. 4 and the passive retainer.
Figure 11:
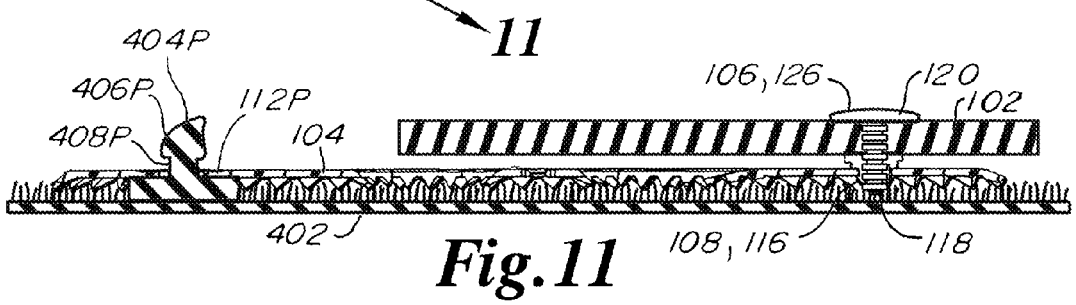
FIG. 11 is a partial cross-section through the system of FIG. 4 and the passive retainer taken at line 11-11 of FIG. 10.

Referring to FIGS. 7, 8 and 9, it can be seen that exemplary active retainer receiver 112A is a slot adapted to receive the rotatable head 406A of exemplary active retainer 404A. Referring to the dimension drawings of FIG. 16 it can be seen that the slot is capable of receiving an active retainer having a rotatable rectangular head up to approximately three-quarters inch by seven-sixteenths inch. The slot is passed over the rotatable head 406A and the head is rotated a quarter of a turn to entrap the adapter plate.

FIG. 16 is a scalable top view dimension drawing of adapter plate 104, FIG. 18 is a scalable multi-view dimension drawing 150 of fastener pin 106, and FIG. 19 is a scalable multi-view dimension drawing 152 of grommet 108. The dimensions provided therein form part of this disclosure.

As should be appreciated, system 100 is adaptable for use in a multitude of various vehicles, including but not limited to all of those of the diagrams of FIGS. 14 and 15. Because the adaptor plate may be rotationally positioned relative to the vehicles retainer and because the adaptor plate includes such a large an array of secondary receivers, the grommet, and therefore the center of the mat portion, may be located over a large range relative to the retainer and the vehicle's floor. Additionally, the fastener pin/grommet connection allows wide flexibility in the rotational alignment of the mat portion relative to the vehicle's floor.

It should be noted that reference to mat portion 102 as the "mat", adapter plate 104 as the "adapter", and the totality of the mat, adapter plate, pin and grommet as the "mat system", is not intended to prevent one from alternatively considering the totality as a "mat", with mat portion 102 serving as a mat portion thereof.

Figure 20:
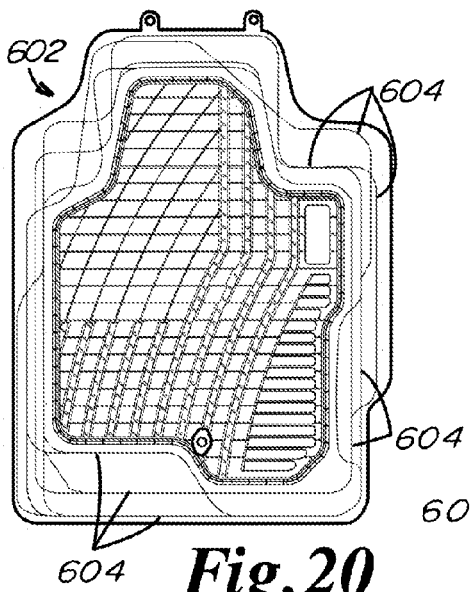
FIG. 20 is a plan view of a trim-to-fit mat for use with the system of FIG. 4.
Figure 21A:
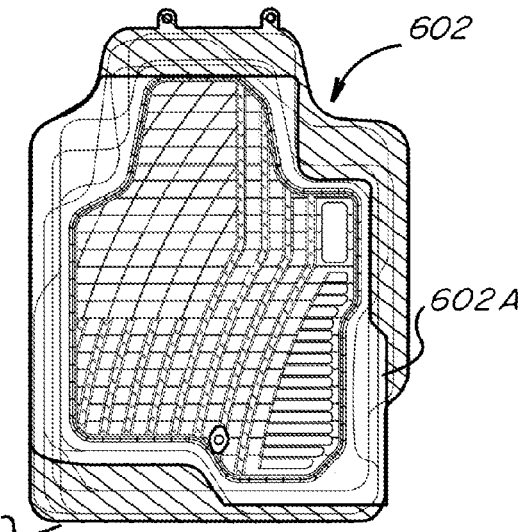
FIG. 21A is a plan view of the trim-to-fit mat of FIG. 20 for use in a second typical automobile, with the to-be-trimmed area shown cross-hatched.
Figure 21B:
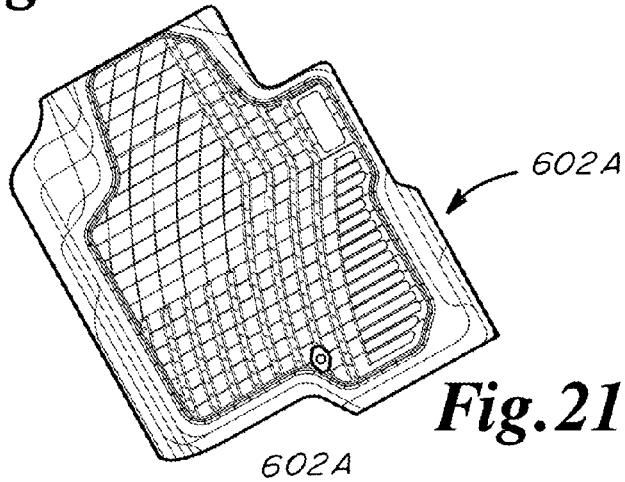
FIG. 21B is a perspective view of the mat of FIG. 21A after trimming.
Figure 21C:
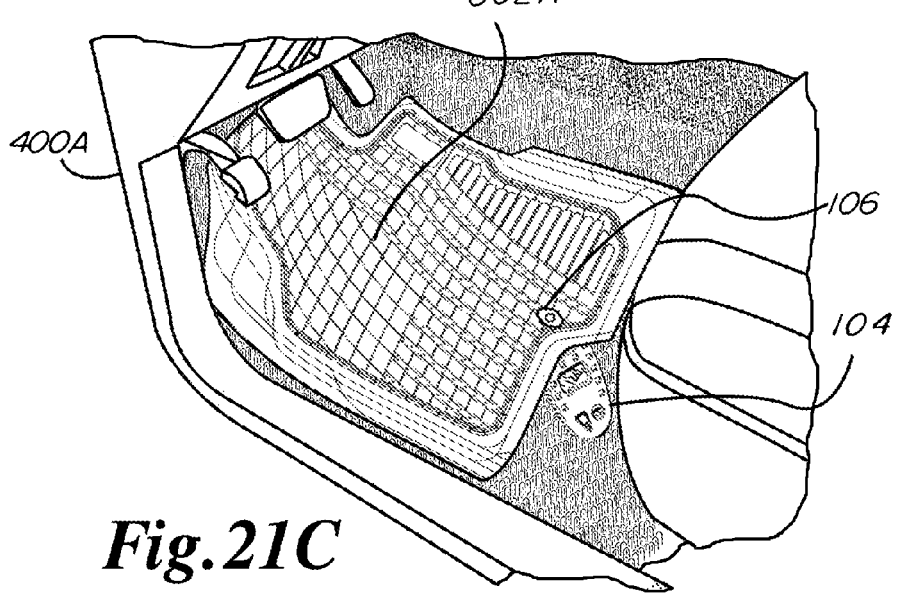
FIG. 21C is a perspective view of the system of FIG. 4 using the mat of FIG. 21B in the second typical automobile.

Referring next to FIG. 20, there is shown a mat 602 for use in the afore-described system which includes a plurality of peripheral outlines 604, which serve as trimming guidlines. Each guideline defines a peripheral shape to which the mat may be selectively trimmed to correspond to a particular model of automobile. FIGS. 21A-21C depict the trimming of the mat 602 for use in automobile model 400A, and FIGS. 22A-22C depict the trimming of the mat 602 for use in automobile model 400B.

In FIG. 21A, mat 602 can be seen to include two portions, useable portion 602A which is shaped to fit automobile model 400A, and waste portion 602AX. Referring FIG. 21B, usable portion 602A is shown post-trimming. In FIG. 21C, usable portion 602A is shown affixed to adapter 104 by fastener 106 and positioned and aligned for proper placement onto the floor of vehicle 400A, as previously described.

The mat may be sold with instructions teaching the end user how to properly trim the mat to fit to his automobile. For instance, each outline may be colored differently and the instruction may include a list of automobile models with the color of the outline that the end-user should follow to trim the mat for that model. Or the user may be instructed to lay his old worn-out OEM mat over the replacement mat to identify the outline that should be followed. Or text may be engraved in the mold that makes the mat so that each outline has a list of corresponding automobile models along side.

After properly trimming his mat 602A to the appropriate shape, the user installs the mat into the automobile as in FIGS. 3 and 4, using the adapter 104 and fastener 106 to properly secure the mat to the automobile's mat retainer 404. The ability to pivot the adapter 104 along a substantially horizontal plane about a fixed vertical axis defined by the mat retainer 404, and to pivot the mat 602A along a substantially horizontal plane about a fixed pivot axis defined by the fastener 106 enables variation of a rotational disposition of the trimmed mat relative to the vehicle floor, to perfectly align and fit the mat to the floor in the intended position and to secure the mat to the floor in the intended manner.

In FIG. 22A, the same mat 602 can be seen to include two different portions, useable portion 602B which is shaped to fit automobile model 400B, and waste portion 602BX. Referring FIG. 22B, usable portion 602B is shown post-trimming. In FIG. 22C, usable portion 602B is shown affixed to adaptor 104 by fastener 106 and positioned and aligned for proper placement onto the floor of different vehicle 400B, as previously described.

It should be understood that while the invention has been shown and described with reference to the specific exemplary embodiment shown, various changes in form and detail may be made without departing from the spirit and scope of the invention, and that the invention should therefore only be limited according to the following claims, including all equivalent interpretation to which they are entitled. It should also be understood that while the exemplary embodiment discloses automotive use, the invention may be useful in any type of vehicle, such as but not limited to trains, trucks, buses, boats, ships, and planes.

We claim:

1. A floor mat for a vehicle floor of the type having a floor mat retainer defining a fixed first vertical axis, the floor mat comprising an adapter portion, a mat portion, and a mat fastener; wherein the adapter portion comprises a planar panel disposed between the mat portion and the vehicle floor and having a primary receiver for engaging the adapter portion to the floor mat retainer, and a multitude of secondary receivers adapted to be selectably engaged by the mat fastener;

the mat portion comprises a locator disposed inboard on the mat portion and engagable to a selected one of the adapter portion's secondary receivers by the mat fastener to define a selectable second vertical axis parallel to the fixed first vertical axis;

the adapter portion is pivotable along a substantially horizontal plane about the fixed first vertical axis such that the selectable second vertical axis is pivotable about the fixed first vertical axis;

the mat portion is pivotable along a substantially horizontal plane about the selectable second vertical axis; and the mat portion comprises a plurality of peripheral outlines for guiding trimming of the mat portion into a mat shape, one of the peripheral outlines intended to cause the mat shape to correspond with a floor shape of the vehicle floor;

whereby trimming of the mat portion along the one of the peripheral outlines causes the mat shape to correspond with the floor shape;

variation in a selection of the adapter portion's secondary receiver to which is engaged the mat portion and pivoting of the adapter about the fixed first vertical axis enables variation of a transverse and longitudinal disposition of the mat portion relative to the vehicle floor; and rotation of the mat portion about the selectable second vertical axis enables variation of a rotational disposition of the mat portion relative to the vehicle floor.

2. The floor mat of claim 1 wherein the adapter portion further comprises cleats extending downwardly there-from to engage the vehicle's floor and prevent inadvertent movement of the adapter portion relative thereto.

3. The floor mat of claim 1 wherein the primary receiver is a passive vehicle floor mat retainer receiver.

4. The floor mat of claim 3 wherein the adapter portion further comprises a second primary receiver adapted to engage the adapter portion to an active vehicle floor mat retainer.

5. The floor mat of claim 1 wherein the primary receiver is an active vehicle floor mat retainer receiver.

6. The floor mat of claim 1 wherein the locator is a hole through the mat portion.

7. The floor mat of claim 6 wherein the fastener comprises separate first and second portions, the first portion having a shank passable through the hole and a head incapable of passing through the hole, and the second portion is a grommet rigidly engageable to the selected secondary receiver and adapted to capture the shank portion to engage the mat portion to the adapter portion.

8. The floor mat of claim 1 wherein the locator comprises the fastener.

9. A floor mat for use on a vehicle floor and for use with an adapter engaged to a mat retainer of the vehicle floor such that the adapter is pivotable about a fixed first vertical axis defined by the mat retainer, and the adapter is of the type having a multitude of receivers to enable engagement of the mat to the adapter in a multitude of dispositions, the floor mat comprising:

a locator disposed inboard on the mat for alignment with a selected one of the receivers to allow variation of a transverse and longitudinal disposition of the mat relative to the adapter, the locator defining a second vertical axis parallel to the fixed first vertical axis; and a plurality of peripheral outlines for guiding trimming of the mat into a mat shape, one of the peripheral outlines intended to cause the mat shape to correspond with a floor shape of the vehicle floor; wherein trimming of the mat portion along the one of the peripheral outlines causes the mat shape to correspond with the floor shape; and rotation of the mat about the second vertical axis causes variation of a rotational disposition of the mat relative to the adapter.

10. The floor mat of claim 9 wherein the mat further comprises a fastener to secure the mat to the adapter.

11. The floor mat of claim 10 wherein the fastener secures the mat to the adapter at the locator.

12. The floor mat of claim 11 wherein the locator comprises the fastener.

13. A floor mat system for use on a vehicle floor and adaptable for engagement to one or more of a multitude of vehicle mat retainers of various types and positions, wherein the system comprises an adapter overlying the vehicle floor and affixable to one of the one or more of a multitude of vehicle mat retainers, and a mat overlying and affixable to the adapter; and wherein the one of the one or more of a multitude of vehicle mat retainers defines a fixed first vertical axis;

the adapter comprises a planar panel having means for engaging the adapter to the one of the one or more of a multitude of vehicle mat retainers such that the adapter is pivotable along a substantially horizontal plane about the fixed first vertical axis, and a multitude of receivers each adapted to allow engagement of the mat thereto;

the mat comprises a locator disposed inboard on the mat and engagable to and alignable with a selected one of the adapter's receivers to enable variation of a transverse and longitudinal disposition of the mat relative to the vehicle's floor, and the locator defines a second vertical axis parallel to the fixed first vertical axis, whereby rotation of the mat along a substantially horizontal plane about the second vertical axis enables variation of a rotational disposition of the mat portion relative to the vehicle's floor and the mat comprises a plurality of peripheral outlines for guiding trimming of the mat into a mat shape, one of the peripheral outlines intended to cause the mat shape to correspond with a floor shape of the vehicle floor, whereby trimming of the mat portion along the one of the peripheral outlines causes the mat shape to correspond with the floor shape.

14. The floor mat of claim 13 wherein the adapter further comprises cleats extending downwardly there-from to engage the vehicle's floor and prevent inadvertent movement of the adapter relative thereto.

15. The floor mat of claim 13 wherein the means for engaging the adapter to the one of the one or more of a multitude of vehicle mat retainers is a receiver for a passive vehicle floor mat retainer.

16. The floor mat of claim 15 wherein the adapter further comprises a receiver for an active vehicle floor mat retainer.

17. The floor mat of claim 13 wherein the means for engaging the adapter to the one of the one or more of a multitude of vehicle mat retainers is a receiver for an active vehicle floor mat retainer.

18. The floor mat of claim 13 wherein the locator is a hole through the mat.

19. The floor mat of claim 18 further comprising a fastener having separate first and second portions, the first portion having a shank passable through the hole and a head incapable of passing through the hole, and the second portion is a grommet rigidly engageable to the selected one of the adapter's receivers wherein the grommet may capture the shank portion to engage the mat to the adapter.

20. The floor mat of claim 13 wherein the locator comprises a fastener for securing the mat to the adapter.

* * * * *